(12) United States Patent
Von Der Haar

(10) Patent No.: US 7,361,902 B2
(45) Date of Patent: Apr. 22, 2008

(54) RADIATION DETECTOR WITH A DETECTION FIELD COMPRISING SCINTILLATORS AND PHOTODIODES

(75) Inventor: Thomas Von Der Haar, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 445 days.

(21) Appl. No.: 10/168,162

(22) PCT Filed: Oct. 10, 2001

(86) PCT No.: PCT/DE01/03879

§ 371 (c)(1),
(2), (4) Date: Oct. 29, 2002

(87) PCT Pub. No.: WO02/33440

PCT Pub. Date: Apr. 25, 2002

(65) Prior Publication Data

US 2003/0136913 A1  Jul. 24, 2003

(30) Foreign Application Priority Data

Oct. 16, 2000  (DE) ............... 100 51 162

(51) Int. Cl.
*G01T 1/20* (2006.01)
(52) U.S. Cl. ................ 250/366; 250/367
(58) Field of Classification Search ........ 250/366, 250/367
See application file for complete search history.

(56) References Cited

U.S. PATENT DOCUMENTS

| 4,609,823 | A | | 9/1986 | Berger et al. |
| 4,947,412 | A | * | 8/1990 | Mattson ............... 378/19 |
| 5,276,328 | A | | 1/1994 | Yoshida et al. |
| 5,378,894 | A | | 1/1995 | Akai |
| 6,118,840 | A | * | 9/2000 | Toth et al. ............ 378/19 |
| 6,304,626 | B1 | * | 10/2001 | Adachi et al. ......... 378/19 |
| 6,396,898 | B1 | * | 5/2002 | Saito et al. .......... 378/19 |
| 6,627,896 | B1 | * | 9/2003 | Hashimoto et al. .... 250/370.11 |

FOREIGN PATENT DOCUMENTS

| DE | OS 195 24 858 | 1/1997 |
| DE | OS 199 35 093 | 2/2001 |
| EP | 932053 A1 * | 7/1999 |

\* cited by examiner

*Primary Examiner*—David Porta
*Assistant Examiner*—Shun Lee
(74) *Attorney, Agent, or Firm*—Schiff Hardin LLP

(57) ABSTRACT

The invention relates to a radiation detector for detecting radiation impinging in a detection zone, having detector elements which are arranged in the form of a preferably two-dimensional array in rows and columns running orthogonally with respect to one another and each have a scintillator and a photodiode interacting with the latter. In this case, detector elements arranged at the edge of array are provided, whose scintillators have an extent transversely with respect to the edge of the array which is larger than is necessary for encompassing the detection zone.

4 Claims, 3 Drawing Sheets

RADIATION DETECTOR WITH A DETECTION FIELD COMPRISING SCINTILLATORS AND PHOTODIODES

BACKGROUND OF THE INVENTION

1. Field of the Invention

The present invention relates to a radiation detector for detecting radiation incident on a detection zone of the detector, of the type having detector elements which are arranged in the form of an array, each having scintillator and a photodiode interacting with the latter.

2. Description of the Prior Art

In radiation detectors of this type which are used for example in the form of so-called multi-row detectors in computed tomography systems, in order to keep signal paths as short as possible, active semiconductor components are mounted as near as possible to the detector area on which the X-ray radiation strikes.

These active semiconductor components are sensitive to X-ray radiation and may be damaged or even destroyed by X-ray radiation.

FIG. 1 shows a known X-ray radiation detector having a number of detector elements, each formed by a scintillator 3 and a photodiode 6, arranged in a substrate. An X-ray beam, originating from a focus F, is incident on the detectors. Despite being gated by diaphragm plates 1 so that margin rays BR reach the extreme edges of the detectors, scattered radiation can nevertheless reach semiconductor components 2, which are disposed at sides of the detector array on a substrate 7, and are connected to photodiodes 6 by bonding wires 5. This scattered radiation arises because X-rays, designated R, can penetrate through the scintillator elements 3 at the edges, causing scattering which results in scattered radiation reaching the semiconductor components 2.

In order to shield the semiconductor components 2 in particular also against scattered radiation SR arising in the scintillators 3, it is possible, in the manner shown in FIG. 2, to position material 4 that greatly absorbs X-ray radiation, e.g. lead, between a scintillator 3 situated at the edge of the array and the semiconductor component 2.

This procedure is costly and complicated since a separate individual part has to be designed, produced and incorporated. Moreover, during incorporation, the bonding wires 5 between the photodiodes 6 of the detector elements and the semiconductor component 2 may be damaged.

Alternatively, it is possible to mount the semiconductor components 2 farther away from the active detector area, which entails, besides the higher susceptibility to interference, a great outlay, since the lines emerging from the numerous photodiodes have to be led via cables and, if appropriate, plugged connections to the semiconductor components 2.

SUMMARY OF THE INVENTION

An object of the present invention is to design a radiation detector of the type initially described wherein, in a simple and cost-effective manner, in particular without additional structural parts, the preconditions are created to allow positioning at active semiconductor components near to the detector area without an appreciable risk of the semiconductor components being damaged by the radiation to be detected.

This object is achieved in accordance with the principles of the present invention in a radiation detector of the type initially described, wherein the detector elements at edges of the detector array have an enlarged extent, proceeding in a direction transversely with respect to the edge of the array, which is larger than is necessary for encompassing the actual detection zone for the incident radiation.

The enlarged extent of the detector elements arranged at the edge of the array beyond the detection zone results in a number of advantages:

the region of the scintillators on which, due to the enlarged extent, X-ray radiation is not directly incident, this region being designated as the passive region hereinafter, absorbs the scattered radiation which propagates from that region of the scintillators of the detector elements arranged at the edge of the array on which radiation directly strikes, this region being designated as active region hereinafter, in the direction of semiconductor components arranged at the edge of the array.

in the event of displacements of the radiation source relative to the radiation detector, which occur for example as a result of thermally produced shifts in the focus of the X-ray source in the case of CT devices, the radiation continues to fall onto the scintillator material, thereby avoiding image artifacts caused by shifts in the radiation source.

the protection of the semiconductor components against scattered radiation is achieved in a very cost-effective manner since, during the production of the radiation detector, only the detector elements arranged at the edge of the array have to be dimensioned with an enlarged extent transversely with respect to the edge of the array, so the additional material costs generally are of little consequence. Additional parts and work operations are not required.

In a preferred embodiment of the invention, the scintillators have a scintillator thickness measured in the direction of the incident radiation and the extent of the scintillators of the detector elements arranged at the edge of the array transversely with respect to the edge of the array is larger by an amount lying in the range from 0.5 to 1.2 times the scintillator thickness. Assuming that the scintillator thickness, in a generally customary manner, is dimensioned such that at least 90% of the primary radiation is absorbed, then 70% to 100% of the scattered radiation is absorbed in the passive region.

In an advantageous variant of the invention the photodiodes associated with the detector elements arranged at the edge of the array have an extent transversely with respect to the edge of the array which is enlarged in accordance with the associated scintillators. Thus the scattered radiation generated in the active region, which, as primary radiation, has previously traversed the object under examination, e.g. a patient, is utilized for imaging, and the radiation dose which has to be fed to an object under examination is reduced. Moreover, the visible light generated in the active region is partly scattered into the passive region and passes to that part of the photodiodes which is assigned to the passive region, so that the photons scattered into the passive region also contribute to the output signal of the radiation detector and are not lost; rather, the light yield rises in the detector elements arranged at the edge of the array.

The detector elements preferably are arranged in rows and columns running orthogonally with respect to one another.

DESCRIPTION OF THE PREFERRED EMBODIMENTS

Figure 1:
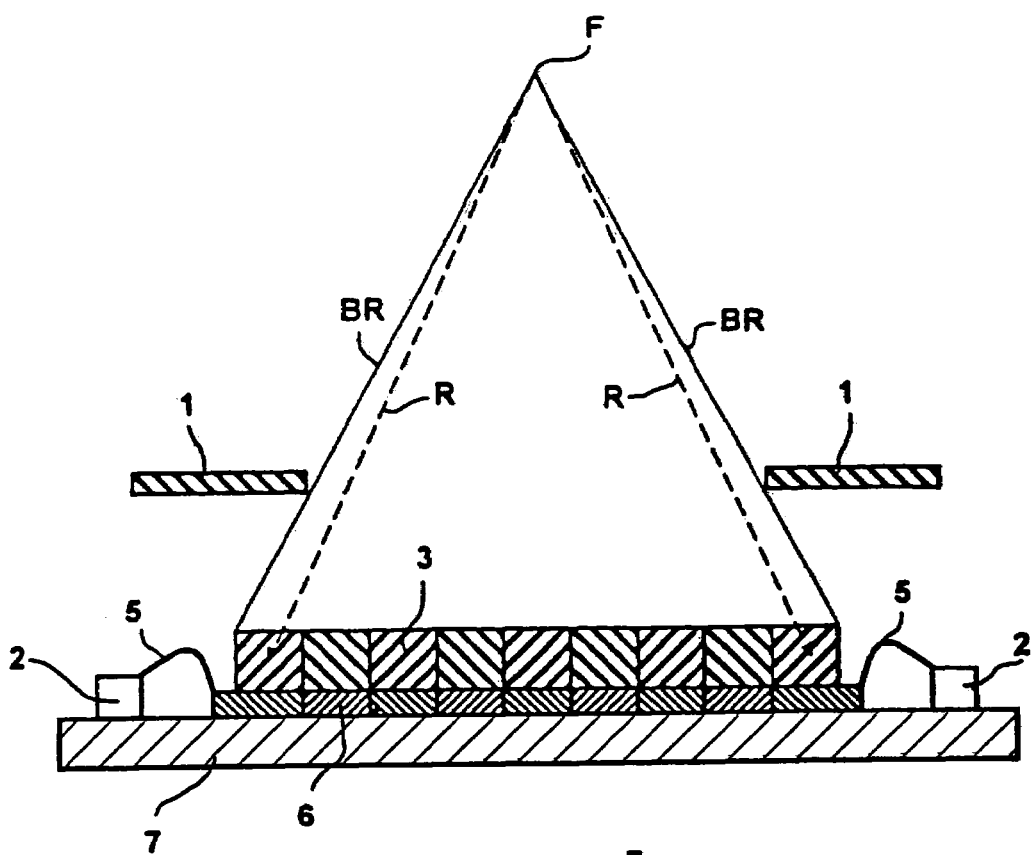
FIGS. 1 and 2, as discussed above, are side sectional views of two embodiments of radiation detectors as are known in the prior art.
Figure 2:
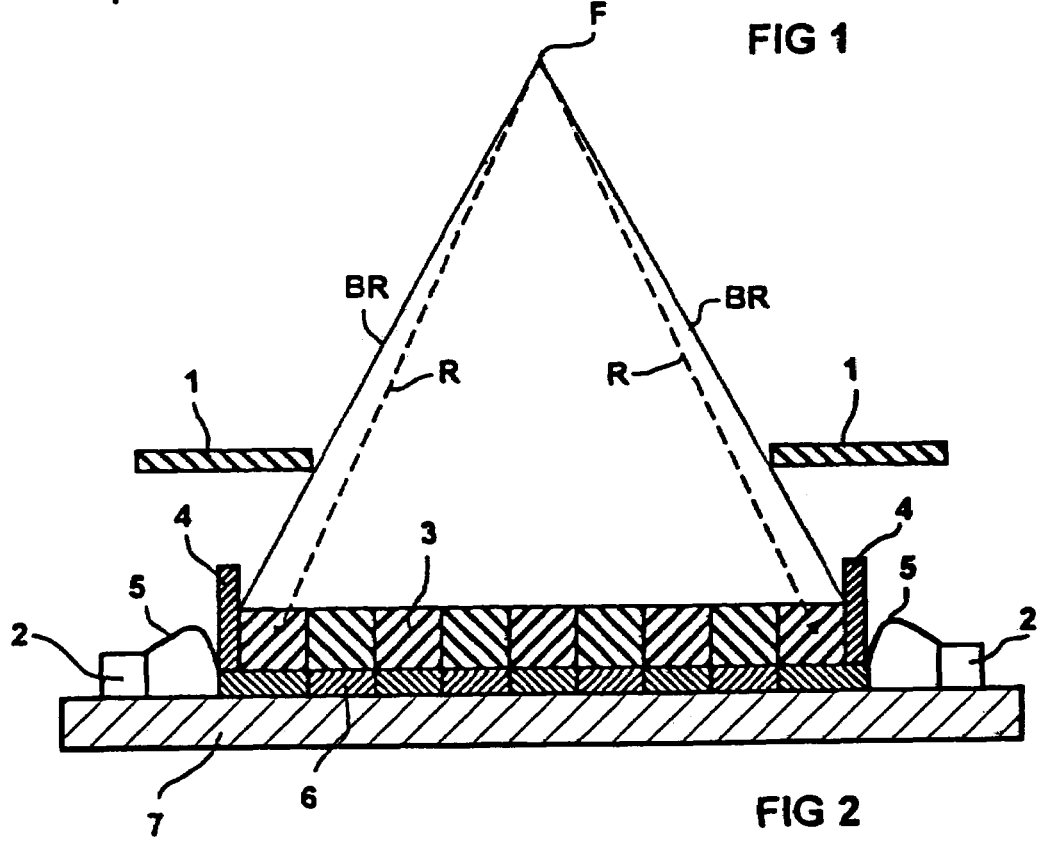
Figure 3:
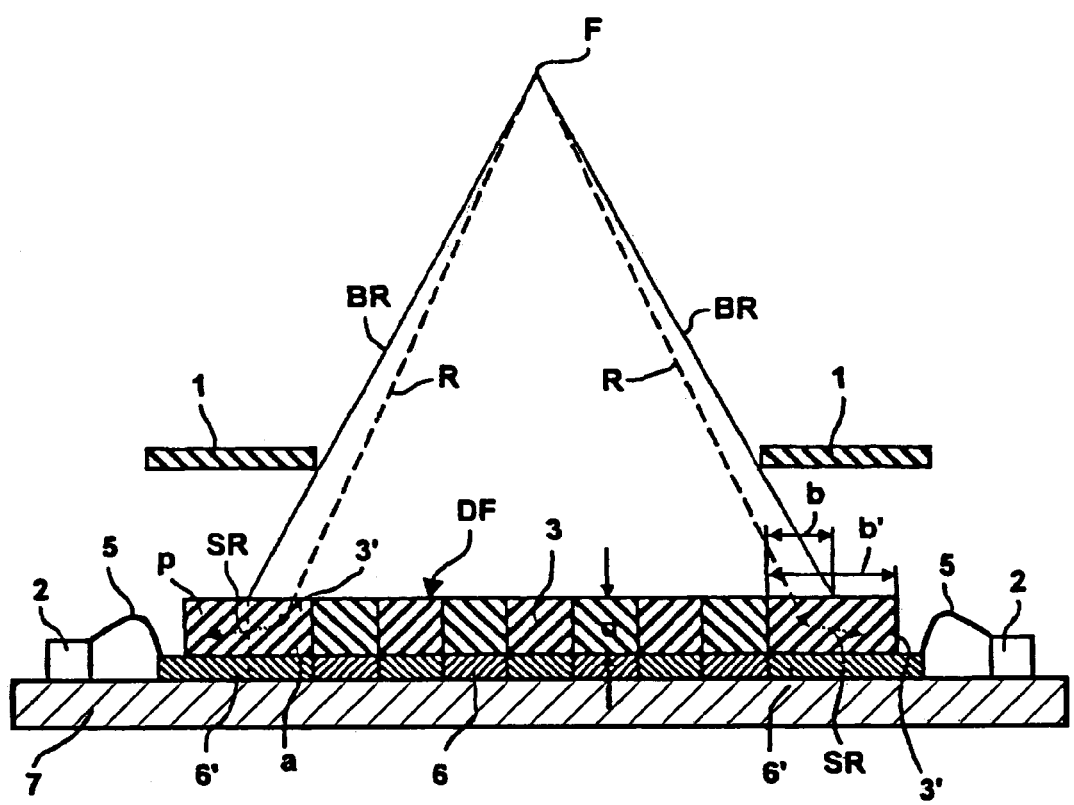
FIG. 3 is a side sectional view of a radiation detector constructed and operating in accordance with the principles of the present invention.
Figure 4:
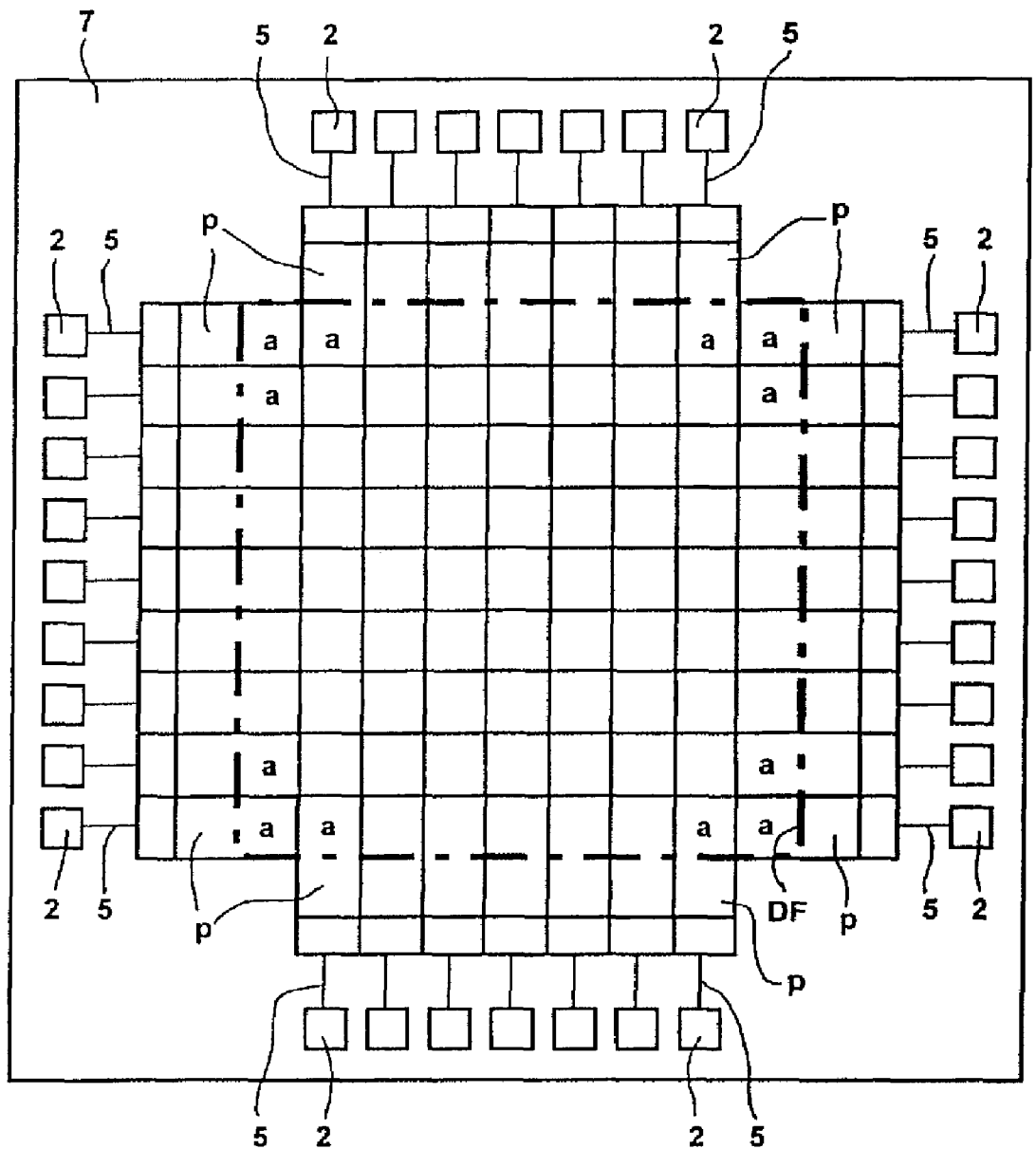
FIG. 4 is a plan view of the radiation detector in accordance with the invention shown in FIG. 3, as seen looking onto to the detector area.

In FIGS. 3 and 4, items, which are identical to those shown in FIGS. 1 and 2, have been provided with the same reference numerals.

As can be seen from FIG. 3 in conjunction with FIG. 4, the radiation detector according to the invention, which is provided, in the exemplary embodiment described, for the detection of X-ray radiation in a CT device, has a substrate 7 on which detector elements are arranged in orthogonal columns and rows in the form of a two-dimensional array. The detector elements are each formed by a scintillator 3 or 3' and a photodiode 6 or 6', not all of the scintillators and photodiodes being provided with a reference symbol for clarity. In a manner that is known and is likewise not illustrated, the detector elements are separated from one another by septa which are opaque to visible light and/or X-ray radiation.

The arrangement is implemented such that the photodiodes 6 or 6' are arranged in a two-dimensional array on the substrate 7 and the scintillators 3 or 3' are fitted on the photodiodes 6 or 6' in the form of a corresponding array by adhesive bonding, for example. In this case, the scintillators 3 face the focus F of the radiation to be detected by the radiation detector.

The photodiodes 6 or 6' are connected by bonding wires 5 to semiconductor components 2 which are arranged on the substrate 7 along the edges of the array of detector elements. For their part, the semiconductor components 2, not all of which are provided with a reference symbol for clarity, are connected to an electronic signal acquisition unit in a manner that is not illustrated.

If X-ray radiation emerging from the focus F propagates to the scintillators 3 or 3', then it is converted into visible light in the scintillators 3 or 3'. This light is detected by the photodiode 6 or 6' assigned to the respective scintillator 3 or 3' and is converted into an electric current which passes via the respective bonding wire 5 to a semiconductor component 2.

Collimator plates 1, as can be seen from the marginal rays of the X-ray radiation which are designated BR in FIG. 3, ensure that X-ray radiation emerging from the focus F can only be incident on a region of the radiation detector which is designated hereinafter as the detection zone and is designated DF in FIGS. 3 and 4.

Both the scintillators 3' and the photodiodes 6' of the detector elements arranged at the edge of the array have an extent b' transversely with respect to the edge of the array which is larger than is intrinsically necessary for encompassing the detection zone DF.

If the extent of the scintillators 3' situated at the edge of the array which suffices for encompassing the detection DF is equal to b, then the following applies for the extent b' of the scintillators 3' situated at the edge of the array $$b+0.5*d \leq b' \leq b+1.2*d,$$

wherein d is the scintillator thickness measured in the direction of the incident X-ray radiation, this thickness being depicted in FIG. 3.

In addition to the active region, designated a in FIGS. 3 and 4, which is required for detecting the X-ray radiation incident in the detection zone DF, the detector elements situated at the edge of the array thus also have a passive region, designated p in FIGS. 3 and 4.

In this case, although X-ray radiation does not directly strike the passive region p of the detector element due to the enlarged extent, the passive region p nonetheless absorbs the scattered radiation which propagates from the active region a of the detector elements on which radiation directly strikes, in particular the corresponding region of the scintillators 3' in the direction of semiconductor components 2 arranged at the edge of the array. This is illustrated in FIG. 3 by X-rays R striking on the scintillators 3' and corresponding rays of the scattered radiation which do not exit the passive region of the scintillators 3'.

Even in the event of inherently undesired shifts in the radiation source relative to the radiation detector, which occurs for example as a result of thermally produced shifts in the focus of the X-ray source in the case of CT devices, the radiation continues to fall onto the scintillator material, thereby avoiding image artifacts caused by shifts in the radiation source.

If the extent of the scintillators 3' is chosen according to the above dimensioning rule, assuming that the scintillator thickness d is chosen such that at least 90% of the primary X-ray radiation emerging from the focus F is absorbed, then 70% to 100% of the scattered radiation is absorbed in the passive region p.

Since the photodiodes 6' associated with the scintillators 3' have an extent transversely with respect to the edge of the array which is enlarged in accordance with the associated scintillators, the scattered radiation generated in the active region a, which as primary radiation has traversed the object under examination, e.g. a patient, is utilized e.g. for imaging. Moreover, the visible light generated in an active region a is partly scattered into the corresponding passive region p and proceeds to that part of the photodiode 6' which is assigned to the passive region p, so that the photons scattered into the passive region p also contribute to the output signal of the radiation detector and are not lost.

In the exemplary embodiment, the detector elements are arranged in parallel rows and parallel columns running orthogonally with respect to one another in the form of two-dimensional array. However, the invention also can be employed in two-dimensional arrays in which the columns do not run orthogonally with respect to the rows or the detector elements are not arranged in rows and columns.

In the exemplary embodiment, the detector elements, apart from those detector elements that are arranged at the edge of the array, each have the same form and size. However, within the scope of the invention, the detector elements not situated at the edge of the array also can differ from one another with regard to their form and/or their size. In particular, these detector elements need not necessarily have the square form that can be seen from FIG. 4.

The detector elements of the radiation detector in accordance with the exemplary embodiment described above are arranged in one plane. This need not necessarily be the case within the scope of the invention. Rather, the detector elements may be arranged in a concave-cylindrically curved area, for example, as may be advantageous for the application in a CT device.

The radiation detector in accordance with the above exemplary embodiment is provided for the detection of X-ray radiation. However, it is suitable for the detection of any desired types of radiation which can be detected with the aid of detector elements composed of a scintillator and a photodiodes.

Although modifications and changes may be suggested by those skilled in the art, it is the invention of the inventor to embody within the patent warranted heron all changes and modifications as reasonably and properly come within the scope of his contribution to the art.

The invention claimed is:

1. A radiation detector comprising:

a plurality of discrete detector elements arranged in a two-dimensional array, each of said detector elements comprising a scintillator and a photodiode interacting with said scintillator, each scintillator converting radiation incident thereon into light, said array having edges and allowing detection of said radiation, emitted from a focus, incident in a detector zone of said array, said radiation having scattered radiation associated therewith; and said detector elements in said array including a plurality of edge detector elements disposed at said edges of said array, the respective scintillators of only said edge detector elements each having an additional extent, compared to detector elements that are not disposed at said edges, said additional extent proceeding transversely with respect to the edge of the array, at which the edge detector element is located and making said edge detector elements larger than necessary for encompassing said detection zone, said detector elements in said array having, in combination, a total radiation-incident area that equals a total light-emitting area of said detector elements in said array, and the respective scintillators of said edge detector elements, in combination, forming a frame around said detection zone that absorbs said scattered radiation and that allows detection of said radiation emitted from said focus if a shift in position of said focus occurs.

2. A radiation detector as claimed in claim 1 wherein each of said scintillators has a scintillator thickness in a propagation direction of radiation incident on said array, and wherein said extent of each of said edge scintillator is larger than is necessary to encompass said detection zone by an amount in a range between 0.5 to 1.2 times the scintillator thickness.

3. A radiation detector as claimed in claim 1 wherein each of said edge detector elements has a photodiode having an enlarged extent in said direction transversely with respect to said edge of said array conforming to the extent of the scintillator interacting therewith.

4. A radiation detector as claimed in claim 1 wherein said detector element are arranged in said two-dimensional array in rows and columns proceeding perpendicularly with respect to each other.

* * * * *